Patented Jan. 22, 1924.

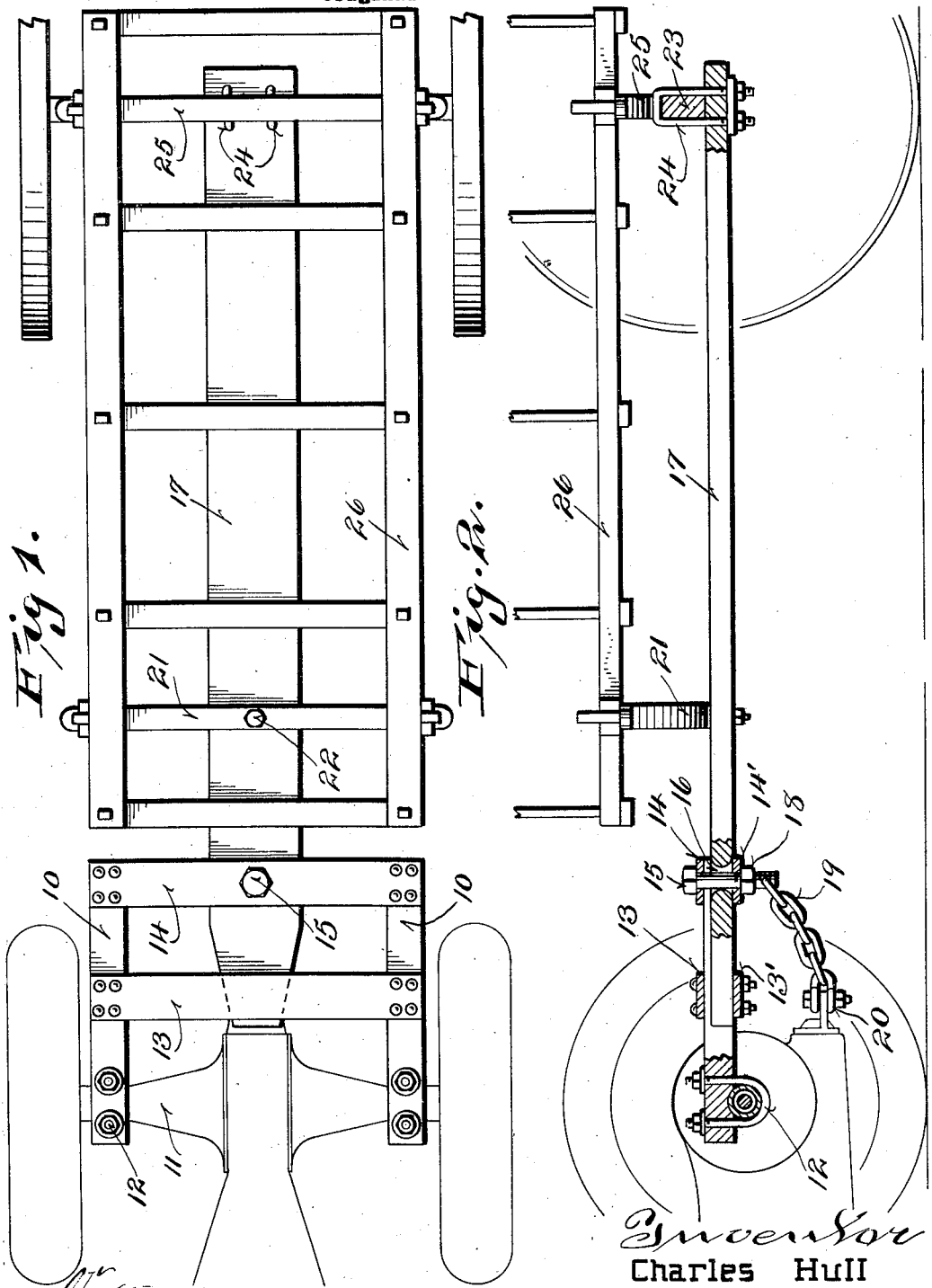

1,481,262

UNITED STATES PATENT OFFICE.

CHARLES HULL, OF TIGERTON, WISCONSIN.

TRAILER ATTACHMENT FOR TRACTORS.

Application filed November 25, 1921, Serial No. 517,664. Renewed November 23, 1923.

*To all whom it may concern:*

Be it known that I, CHARLES HULL, a citizen of the United States, and resident of Tigerton, in the county of Shawano and State of Wisconsin, have invented certain new and useful Improvements in Trailer Attachments for Tractors; and I do hereby declare that the following is a full, clear, and exact description thereof.

My invention relates to a trailer structure and devices for connecting it to a tractor. It contemplates the provision of a connecting means giving universal movement to a reach which extends under the front bolster of a wagon and is secured to the rear axle thereof. The connecting means is especially strong and durable and may be affixed to a standard tractor and the structure is designed to utilize ordinary wagon parts.

Special objects of the invention are the prevention of the raising of the front of the tractor and the transfer of weight of the load from the trailer to the rear wheels of the tractor. This transfer gives greater traction to the tractor, thus enabling it to pull a heavier load and has the further advantage of utilizing the large tires of the tractor as a support. This tends to prevent miring.

My structure is further advantageous in that it is designed to permit closer linkage of the trailer with the tractor which precludes looseness of operation and is especially desirable in making turns.

Other advantages and objects will appear as the description proceeds.

Reference is had to the accompanying drawing wherein,

Figure 1 is a plan view of my device, and Figure 2 is a side elevation thereof with parts in section.

Supports 10 are pivotally mounted on tractor housing 11 by U bolts 12, the positioning of which prevents lateral travel of the supports with respect to the housing, the tapered character of the housing checking movement of the U bolts. Grooves in the housing may be utilized for this purpose. Plates 13—13' and 14—14' connect supports 10 and are rigidly secured thereto. In practice these have been made of oak pieces 5 x 6, but any material may be used, as for instance, channel iron. Plates 14—14' are apertured to receive a king bolt 15 passing thru a hole 16 in reach 17 and secured by nut 18. Chain 19 is affixed to bolt 15 by means of an aperture therein, and connects with tractor hitch 20. Chain 19 has such slackness as to permit vertical play of members 10 on the housing for a limited distance, but operates to prevent the lifting of the front of the tractor. Reach 17 is of smaller depth than supports 10 and in the practical construction, it was 4", being spaced 1" from plates 13 and 14 and resting on plates 13' and 14'. This gives a desired amount of play to the trailer.

Wagon bolster 21 is secured by a bolt 22 to reach 17, and reach 17 extends beneath the rear axle 23 and is secured thereto by U bolts 24. Bolsters 21 and 25 support any desired type of wagon structure 26. It is apparent that the tractor may be directed laterally with respect to the trailer by reason of the pivotal connection at king bolt 15.

Again, the trailer rear axle may move up or down with respect to the tractor, by reason of the pivotal connection on the housing. The trailer may be of any desired length, but it will be observed that it is especially designed to utilize standard wagon parts. The wagon parts may be readily assembled with respect to the reach 17, and bolts 22 and 24 may be placed in position. There is no excessive or undesirable looseness of parts and a structure of great strength and durability results.

While a preferred embodiment of the invention has been illustrated and described, it is to be understood that the present invention is not confined to such specific embodiment, but may be otherwise embodied within the spirit of the invention and the scope of the following claims, and it will further be understood that a substantial range of equivalence is contemplated.

I claim:

1. The combination of a tractor axle housing, supports pivotally secured thereto, a pair of apertured plates vertically aligned and spaced by said supports, a second pair of plates spaced by said supports and vertically aligned, a reach resting upon the lower two of said plates, a pin connecting said reach with the first mentioned pair of plates, said reach extending between said second mentioned pair of plates and freely slidable at all times therebetween.

2. The combination of a rear axle housing, supports pivotally connected thereto, members connecting said supports, a reach, a bolt connecting said members and said reach, a chain connected to said bolt at its lower end, and a tractor hitch secured to said chain.

In testimony that I claim the foregoing I have hereunto set my hand at Tigerton, in the county of Shawano and State of Wisconsin.

CHARLES HULL.